(12) United States Patent
Yu

(10) Patent No.: US 11,826,711 B2
(45) Date of Patent: Nov. 28, 2023

(54) REGENERABLE ORGANIC CONTAMINANT CONTROLLER IN SPACE APPLICATION

(71) Applicant: Hamilton Sundstrand Corporation, Charlotte, NC (US)

(72) Inventor: Ping Yu, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 45 days.

(21) Appl. No.: 17/678,641

(22) Filed: Feb. 23, 2022

(65) Prior Publication Data
US 2023/0264151 A1    Aug. 24, 2023

(51) Int. Cl.
*B01D 53/22* (2006.01)
*B01D 69/08* (2006.01)
(Continued)

(52) U.S. Cl.
CPC .......... *B01D 69/08* (2013.01); *B01D 53/227* (2013.01); *B01D 53/228* (2013.01); *B01D 63/043* (2013.01); *B01D 65/02* (2013.01); *B01D 71/021* (2013.01); *B01D 2053/224* (2013.01); *B01D 2313/21* (2013.01); *B01D 2313/22* (2013.01);
(Continued)

(58) Field of Classification Search
CPC .. B01D 2321/32; B01D 69/08; B01D 63/043; B01D 2321/18; B01D 2313/21; B01D 2321/26; B01D 53/228; B01D 2319/04; B01D 2313/22; B01D 53/227; B01D 71/021; B01D 2053/224; B01D 65/02
See application file for complete search history.

(56) References Cited

U.S. PATENT DOCUMENTS 5,281,254 A    1/1994  Birbara et al.
6,022,742 A *  2/2000  Kopf .................. C12M 29/16
                                                         210/791
(Continued)

FOREIGN PATENT DOCUMENTS

DE    4104513 A1    8/1991
WO    0187461 A1    11/2001
WO    2008110820 A1  9/2008

OTHER PUBLICATIONS

Alsalhy et al., "Ploy(ether sulfone) (PES) hollow-fiber membranes prepared from various spinning parameters", Desalination, 2014, pp. 21-35.
(Continued)

*Primary Examiner* — Anthony R Shumate
(74) *Attorney, Agent, or Firm* — CANTOR COLBURN LLP

(57) ABSTRACT

A regenerable organic contaminant controller includes a carbon hollow fiber module that includes a passage between an inlet and an outlet, on an opposite end of the carbon hollow fiber module from the inlet, such that organic contaminants in contaminated air flowing through the passage are desorbed into pores of the carbon hollow fiber module. The regenerable organic contaminant controller also includes wires coupled to the inlet of the carbon hollow fiber module and to the outlet of the carbon hollow fiber module. The wires heat the carbon hollow fiber module based on a flow of electricity through the wires. The heat causes release of the organic contaminants from the pores of the carbon hollow fiber module.

16 Claims, 3 Drawing Sheets

(51) Int. Cl.
  *B01D 63/04* (2006.01)
  *B01D 65/02* (2006.01)
  *B01D 71/02* (2006.01)

(52) U.S. Cl.
  CPC ...... *B01D 2319/04* (2013.01); *B01D 2321/18* (2013.01); *B01D 2321/26* (2013.01); *B01D 2321/32* (2013.01)

(56) References Cited

U.S. PATENT DOCUMENTS

| | | | |
|---|---|---|---|
| 6,364,936 | B1 | 4/2002 | Rood et al. |
| 6,702,875 | B2 | 3/2004 | Jagtoyen et al. |
| 11,666,852 | B1* | 6/2023 | Weissman .......... B01D 53/0407 95/90 |
| 2004/0026315 | A1* | 2/2004 | Han .................. B01D 69/087 210/500.41 |
| 2004/0103782 | A1* | 6/2004 | Wascheck ............. C07C 7/144 96/135 |
| 2009/0314708 | A1* | 12/2009 | Yeom .................. B01D 69/10 428/313.9 |
| 2010/0035751 | A1* | 2/2010 | Perera ............... B01J 20/28023 502/402 |
| 2013/0001174 | A1* | 1/2013 | Zacharias .............. C02F 1/02 210/774 |
| 2013/0032760 | A1* | 2/2013 | Werth ................ C01B 13/0251 252/372 |
| 2014/0174295 | A1 | 6/2014 | Tai et al. |
| 2014/0255283 | A1* | 9/2014 | Sidheswaran ............ B01J 23/34 423/605 |
| 2017/0144108 | A1* | 5/2017 | Kim ....................... B01D 69/02 |
| 2018/0369761 | A1* | 12/2018 | Hessler ................. B01D 53/22 |
| 2019/0076785 | A1* | 3/2019 | Bauer ................. B01D 63/021 |
| 2019/0118160 | A1* | 4/2019 | Ihsan ....................... B01J 20/16 |
| 2019/0201847 | A1* | 7/2019 | Kim ......................... D04C 3/48 |
| 2020/0298182 | A1* | 9/2020 | Futamura ............. B01D 69/148 |
| 2022/0161233 | A1* | 5/2022 | Ahmadi ............... A61M 1/3413 |

OTHER PUBLICATIONS

Amirilargani et al., "Improvement of Permeation Performance of Polyethersulfone (PES) Ultrafiltration Membranes via Addition of Tween-20", Journal of Allied Polymer Scient, vol. 115, 2010, pp. 504-513.

Omidvar et al., "Preparation of hydrophilic nanofiltration membranes for removal of pharmaceuticals from water", Journal of Environmental Health Science & Engineering, 2015, pp. 1-9.

Tewfik et al., "Effect of spinning parameters of polyethersulfone based hollow fiber membranes on morphological and mechanical properties", Membrane Water Treatment, vol. 9, No. 1, 2018, pp. 43-51.

Abstract of DE4104513 (A1), Published: Aug. 29, 1991, 1 page.

European Search Report for Application No. 23156472.5, dated Aug. 24, 2023, 7 pages.

* cited by examiner

REGENERABLE ORGANIC CONTAMINANT CONTROLLER IN SPACE APPLICATION

BACKGROUND

Exemplary embodiments pertain to the art of contaminant control and, in particular, to a regenerable organic contaminant controller in a space application.

Potable water and breathable air are central elements to habitable conditions in any environment. These elements are more challenging to maintain in certain environment such as, for example, in a space vehicle or in a planetary habitat. Filtering of air and water for reuse are necessary processes for sustaining life without transporting impractical amounts of supplies. For example, a phase separator may be used to separate water particles from air for the reuse of both. Amine beds are another example of a purifying system and are used to capture carbon dioxide from air and allow the recirculation of the air. Trash compaction and control is another important aspect to maintaining habitation.

BRIEF DESCRIPTION

In one embodiment, a regenerable organic contaminant controller includes a carbon hollow fiber module that includes a passage between an inlet and an outlet, on an opposite end of the carbon hollow fiber module from the inlet, such that organic contaminants in contaminated air flowing through the passage are desorbed into pores of the carbon hollow fiber module. The regenerable organic contaminant controller also includes wires coupled to the inlet of the carbon hollow fiber module and to the outlet of the carbon hollow fiber module, the wires heat the carbon hollow fiber module based on a flow of electricity through the wires. The heat releases the organic contaminants from the pores of the carbon hollow fiber module.

Additionally or alternatively, the regenerable organic contaminant controller also includes a housing to house a plurality of the carbon hollow fiber modules.

Additionally or alternatively, the regenerable organic contaminant controller also includes a first header capping the inlets of the plurality of the carbon hollow fiber modules in the housing.

Additionally or alternatively, the regenerable organic contaminant controller also includes a second header capping the outlets of the plurality of the carbon hollow fiber modules in the housing.

Additionally or alternatively, one of the wires is coupled to the inlets of the carbon hollow fiber modules through the first header and another of the wires is coupled to the outlets of the carbon hollow fiber modules through the second header.

Additionally or alternatively, the wires are coupled to a current source.

Additionally or alternatively, the regenerable organic contaminant controller also includes a nitrogen source coupled to the inlet of the carbon hollow fiber module to flow the nitrogen through the passage of the carbon hollow fiber module to sweep out the organic contaminants released from the pores of the carbon hollow fiber module.

Additionally or alternatively, the regenerable organic contaminant controller also includes a vacuum coupled to the outlet of the carbon hollow fiber module to draw the organic contaminants released from the pores of the carbon hollow fiber module out of the passage.

In another embodiment, a method of assembling a regenerable organic contaminant controller includes obtaining a carbon hollow fiber module that includes a passage between an inlet and an outlet, on an opposite end of the carbon hollow fiber module from the inlet, such that organic contaminants in contaminated air flowing through the passage are desorbed into pores of the carbon hollow fiber module. The method also includes coupling wires to the inlet of the carbon hollow fiber module and to the outlet of the carbon hollow fiber module to heat the carbon hollow fiber module based on a flow of electricity through the wires. The heat releases the organic contaminants from the pores of the carbon hollow fiber module.

Additionally or alternatively, the method also includes arranging a housing to house a plurality of the carbon hollow fiber modules.

Additionally or alternatively, the method also includes capping the inlets of the plurality of the carbon hollow fiber modules in the housing with a first header.

Additionally or alternatively, the method also includes capping the outlets of the plurality of the carbon hollow fiber modules in the housing with a second header.

Additionally or alternatively, the method also includes coupling one of the wires to the inlets of the carbon hollow fiber modules through the first header and coupling another of the wires to the outlets of the carbon hollow fiber modules through the second header.

Additionally or alternatively, the method also includes coupling the wires to a current source.

Additionally or alternatively, the method also includes coupling a nitrogen source to the inlet of the carbon hollow fiber module to flow the nitrogen through the passage of the carbon hollow fiber module to sweep out the organic contaminants released from the pores of the carbon hollow fiber module.

Additionally or alternatively, the method also includes coupling a vacuum to the outlet of the carbon hollow fiber module to draw the organic contaminants released from the pores of the carbon hollow fiber module out of the passage.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Embodiments of the systems and methods detailed herein relate to a regenerable organic contaminant controller in a space application. As previously noted, trash compaction is an important aspect of maintaining a habitable environment. A large volume of organic compounds is typically generated and must be removed after heating and compaction. Granular activated carbon is an effective sorbent for organic compounds. However, prior approaches to using carbon powder have replaced the sorbent after full adsorption. For a long-duration mission, carrying a significant volume and corresponding mass of expendable carbon sorbent is infeasible. As detailed, one or more embodiments relate to a hollow carbon fiber module that is regenerable at high temperature.

Figure 1:
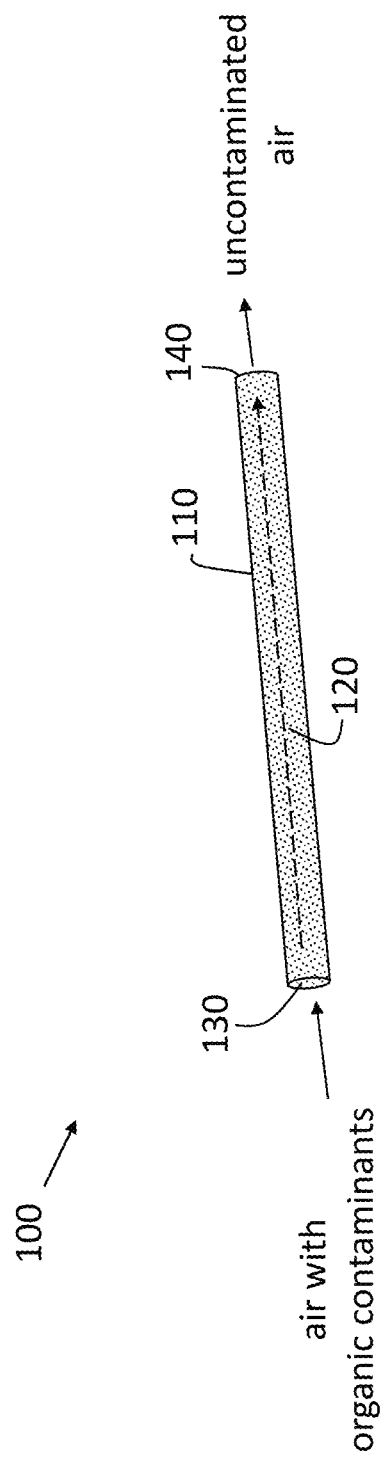
FIG. 1 shows an exemplary carbon hollow fiber module that is part of the regenerable organic contaminant controller according to one or more embodiments.

FIG. 1 shows an exemplary carbon hollow fiber module 110 that is part of the regenerable organic contaminant controller 100 according to one or more embodiments. The exemplary carbon hollow fiber module 110 is shown as a pipe with a circular cross-sectional shape. In alternate embodiments, the cross-sectional shape of the carbon hollow fiber module 110 is not limited and may be, for example, square, oval, octagonal, or the like. Formation of a carbon hollow fiber membrane (CHFM) that constitutes the carbon hollow fiber module 110 is known and may be implemented via different specific processes. The details of the various processes are not included herein. As an example, a molten polymer is pulled through a specialized apparatus (i.e., extruder) to form a hollow cylindrical body followed by subsequent carbonization of the cylindrical body to form the carbon hollow fiber module 110. Thus, the carbon hollow fiber module 110 includes a hollow flow path or passage 120, as shown.

The passage 120 is between an inlet 130 of the carbon hollow fiber module 110 and an outlet 140, on an opposite end of the carbon hollow fiber module 110 as the inlet 130. As indicated, air with organic contaminants may flow into the passage 120 via the inlet 130. The organic compounds that make up the contaminant are desorbed from the air particles and absorbed into the pores of the carbon hollow fiber module 110. As such, uncontaminated air, without the organic contaminants, flows out of the passage 120 via the outlet 140.

Figure 2:
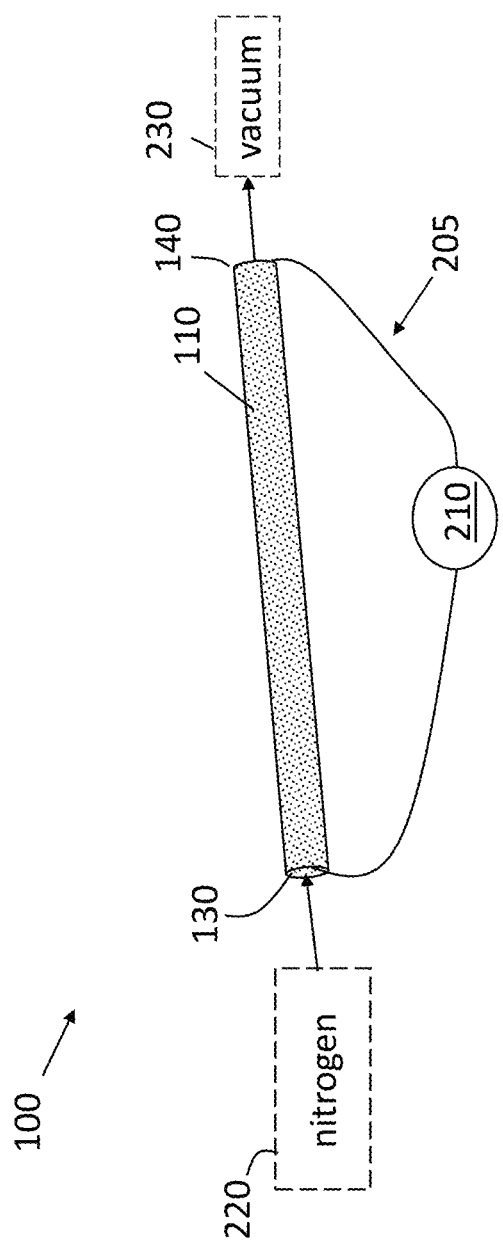
FIG. 2 illustrates aspects of the regenerable organic contaminant controller, according to one or more embodiments, during regeneration.

FIG. 2 illustrates aspects of the regenerable organic contaminant controller 100, according to one or more embodiments, during regeneration. As shown, wires 205 from a current source 210 are connected to both sides (i.e., inlet 130, outlet 140) of the carbon hollow fiber module 110. When current flows through the wires 205, the carbon hollow fiber module 110 heats up (e.g., over 200 degrees Celsius), causing a release of the organic contaminants from the pores of the structure. FIG. 2 show optional additional elements that may be used in the regeneration of the carbon hollow fiber module 110.

A nitrogen source 220 may be coupled to the carbon hollow fiber module 110 to flow nitrogen from the inlet 130 to the outlet 140. The nitrogen flow through the passage 120 may sweep the released organic compounds out of the outlet 140, which may be exposed to space, for example. An alternate option involves a vacuum 230 that may pull the released organic compounds out via the outlet 140 for release into space, for example.

Figure 3:
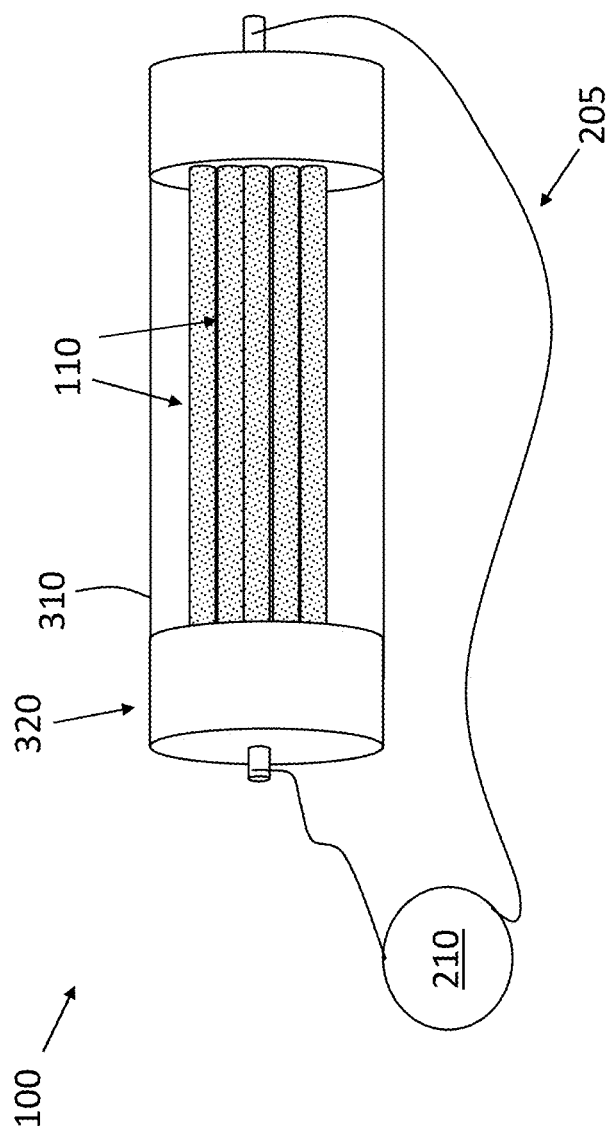
FIG. 3 shows a regenerable organic contaminant controller according to one or more embodiments.

FIG. 3 shows a regenerable organic contaminant controller 100 according to one or more embodiments. Any number of carbon hollow fiber modules 110 may be grouped together in a housing 310. A header 320 may optionally be added at each end (i.e., inlet 130, outlet 140) of the set of carbon hollow fiber modules 110, as shown in FIG. 3. Each header 320 may cap one end of the carbon hollow fiber modules 110 in the housing 310 (i.e., one header 320 at the end of the housing 310 with the inlets 130 of the carbon hollow fiber modules 110 and one header 320 at the end of the housing with the outlets 140 of the carbon hollow fiber modules 110) and hold together the carbon hollow fiber modules 110. As shown, a current source 210 is connected, via wires 205, to the header 320 at each end. Application of current to the headers 320 results in heating of the carbon hollow fiber modules held together by the headers 320 and initiates the regeneration process discussed with reference to FIG. 2.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A regenerable organic contaminant controller, comprising:
   a carbon hollow fiber module that includes a passage between an inlet and an outlet, on an opposite end of the carbon hollow fiber module from the inlet, such that organic contaminants in contaminated air flowing through the passage are desorbed into pores of the carbon hollow fiber module; and
   wires coupled to the inlet of the carbon hollow fiber module and to the outlet of the carbon hollow fiber module, the wires configured to heat the carbon hollow fiber module based on a flow of electricity through the wires, wherein the heat is configured to release the organic contaminants from the pores of the carbon hollow fiber module.

2. The regenerable organic contaminant controller according to claim 1, further comprising a housing configured to house a plurality of the carbon hollow fiber modules.

3. The regenerable organic contaminant controller according to claim 2, further comprising a first header capping the inlets of the plurality of the carbon hollow fiber modules in the housing.

4. The regenerable organic contaminant controller according to claim 3, further comprising a second header capping the outlets of the plurality of the carbon hollow fiber modules in the housing.

5. The regenerable organic contaminant controller according to claim 4, wherein one of the wires is coupled to the inlets of the carbon hollow fiber modules through the first header and another of the wires is coupled to the outlets of the carbon hollow fiber modules through the second header.

6. The regenerable organic contaminant controller according to claim 1, wherein the wires are configured to couple to a current source.

7. The regenerable organic contaminant controller according to claim 1, further comprising a nitrogen source coupled to the inlet of the carbon hollow fiber module to flow the nitrogen through the passage of the carbon hollow fiber module to sweep out the organic contaminants released from the pores of the carbon hollow fiber module.

8. The regenerable organic contaminant controller according to claim 1, further comprising a vacuum coupled to the outlet of the carbon hollow fiber module to draw the organic contaminants released from the pores of the carbon hollow fiber module out of the passage.

9. A method of assembling a regenerable organic contaminant controller, the method comprising:
   obtaining a carbon hollow fiber module that includes a passage between an inlet and an outlet, on an opposite end of the carbon hollow fiber module from the inlet, such that organic contaminants in contaminated air flowing through the passage are desorbed into pores of the carbon hollow fiber module; and
   coupling wires to the inlet of the carbon hollow fiber module and to the outlet of the carbon hollow fiber module to heat the carbon hollow fiber module based on a flow of electricity through the wires, wherein the heat is configured to release the organic contaminants from the pores of the carbon hollow fiber module.

10. The method according to claim 9, further comprising arranging a housing to house a plurality of the carbon hollow fiber modules.

11. The method according to claim 2, further comprising capping the inlets of the plurality of the carbon hollow fiber modules in the housing with a first header.

12. The method according to claim 11, further comprising capping the outlets of the plurality of the carbon hollow fiber modules in the housing with a second header.

13. The method according to claim 12, further comprising coupling one of the wires to the inlets of the carbon hollow fiber modules through the first header and coupling another of the wires to the outlets of the carbon hollow fiber modules through the second header.

14. The method according to claim 9, further comprising coupling the wires to a current source.

15. The method according to claim 9, further comprising coupling a nitrogen source to the inlet of the carbon hollow fiber module to flow the nitrogen through the passage of the carbon hollow fiber module to sweep out the organic contaminants released from the pores of the carbon hollow fiber module.

16. The method according to claim 9, further comprising coupling a vacuum to the outlet of the carbon hollow fiber module to draw the organic contaminants released from the pores of the carbon hollow fiber module out of the passage.

* * * * *